United States Patent Office 2,960,537
Patented Nov. 15, 1960

2,960,537
4-DIPHENYLETHANE-ALDEHYDE

Guido Cavallini and Elena Massarani, Milan, Italy, assignors to Francesco Vismara, S.p.A., Casatenovo (Como), Italy No Drawing. Filed Apr. 29, 1957, Ser. No. 655,528

Claims priority, application Italy July 5, 1956

1 Claim. (Cl. 260—599)

The present invention relates to a novel organic compound, 4-diphenylethane-aldehyde, and to a process for its preparation.

We have found that 4-diphenylethane-aldehyde has utility as a stable intermediate for the production of physiologically active substances. As described in our application Serial No. 655,523, and now Patent No. 2,885,434, entitled "New β-Phenylacrylic Acids," filed on the same day herewith, 4-diphenylethane-aldehyde is a useful intermediate for the preparation of β-4-diphenylethane-acrylic acid, a new compound which shows unexpected antiinflammatory and antireactional properties. As described in the co-pending application Ser. No. 655,523, the β-4-diphenylethane-acrylic acid is obtained by condensing the 4-diphenylethane-aldehyde with malonic acid, in the presence of an organic base such as pyridine, piperydine and the like.

The novel compound of the present invention and the process for the preparation thereof is indicated by the following representative formulae:

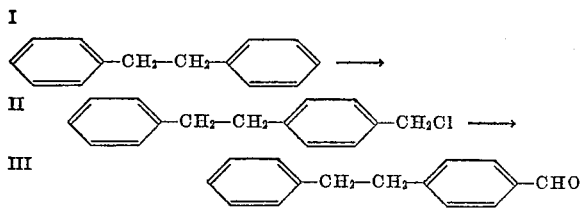

According to the process of the present invention dibenzyl (I) is at first converted to 4-chloromethyl-diphenylethane (II). This new compound is readily obtained by heating the starting material with formaldehyde and concentrated hydrochloric acid, in the presence of concentrated sulfuric acid. The chloromethylation step may be only accomplished by employing as reaction solvent the acetic acid.

4-chloromethyl-diphenylethane is then converted to (III) 4-diphenylethane-aldehyde by treatment with hexamethylentetramine (urotropine) in the presence of an halogenated solvent such as chloroform.

The following example serves to illustrate the invention without, however, limiting the same to it.

Example.—In a three-necked flask equipped with a mechanical stirrer and a thermometer were placed 225 g. of dibenzyl, 600 cc. of glacial acetic acid, 175 cc. of formalin, containing about 37 percent of formaldehyde, and 490 cc. of concentrated hydrochloric acid. The resulting mixture was heated on a water bath at about 65° C. and thereto 350 cc. of concentrated sulfuric acid were added slowly, under vigorous stirring, during a period of about three hours. The reaction mixture was allowed to stand at a temperature of about 65° C. for another twenty-one hours, after which time it was poured into a 12 litres beaker two-thirds filled with crushed ice. The organic layer was separated and the acidic solution extracted repeatedly with ether. The combined washings and organic layer were washed with sodium bicarbonate solution and water until neutral, dried over anhydrous sodium sulfate and concentrated. The residue was distilled at low pressure (0.5 mm. about) by collecting the fraction which passes at 170°/0.5 mm. The yield of pure 4-chloromethyl-diphenylethane was 115 g.

Analysis.—Calcd. for $C_{15}H_{15}Cl$: Cl. 15.37. Found: Cl, 15.31.

A solution of 23 gr. of 4-chloromethyl-diphenylethane, 16 g. of urotropine and 100 cc. of chloroform was placed in a reaction flask equipped with a reflux condenser. The mixture was heated under reflux with stirring for two hours, after which time the solvent was removed by distillation under reduced pressure and to the residue 80 cc. of dilute acetic acid (fifty percent) were added. The resulting mixture was heated under reflux for another two hours, then, after cooling, poured into 200 cc. of water and repeatedly extracted with ether. The ether solution was washed with cold ten percent aqueous sodium bicarbonate solution and dried over anhydrous sodium sulfate. The drying agent was removed by filtration and the ether evaporated. The residue was distilled at low pressure (one mm. about) and the product at B.P. 135–140°/1 mm. collected. Yield 11 g. 4-diphenylethane-aldehyde can be characterised by the corresponding 2,4-dinitrophenylhydrazone which shows melting point 202° C.

Analysis.—Calcd. for $C_{21}H_{18}O_4N_4$: N, 14.35. Found: N, 14.26.

What we claim is:
4-diphenylethane-aldehyde.

References Cited in the file of this patent
UNITED STATES PATENTS
2,800,511    Carpenter et al. _____ July 23, 1957

OTHER REFERENCES
Vavon et al.: Compt. Rend., vol. 204 (1937), pages 1826–1828.
Natelson et al.: J. Am. Chem. Soc., vol. 58, pages 1433, 1436 (1936).
Adams et al.: Organic Reactions, vol. I (1954), page 77.